United States Patent Office 3,254,246
Patented May 31, 1966

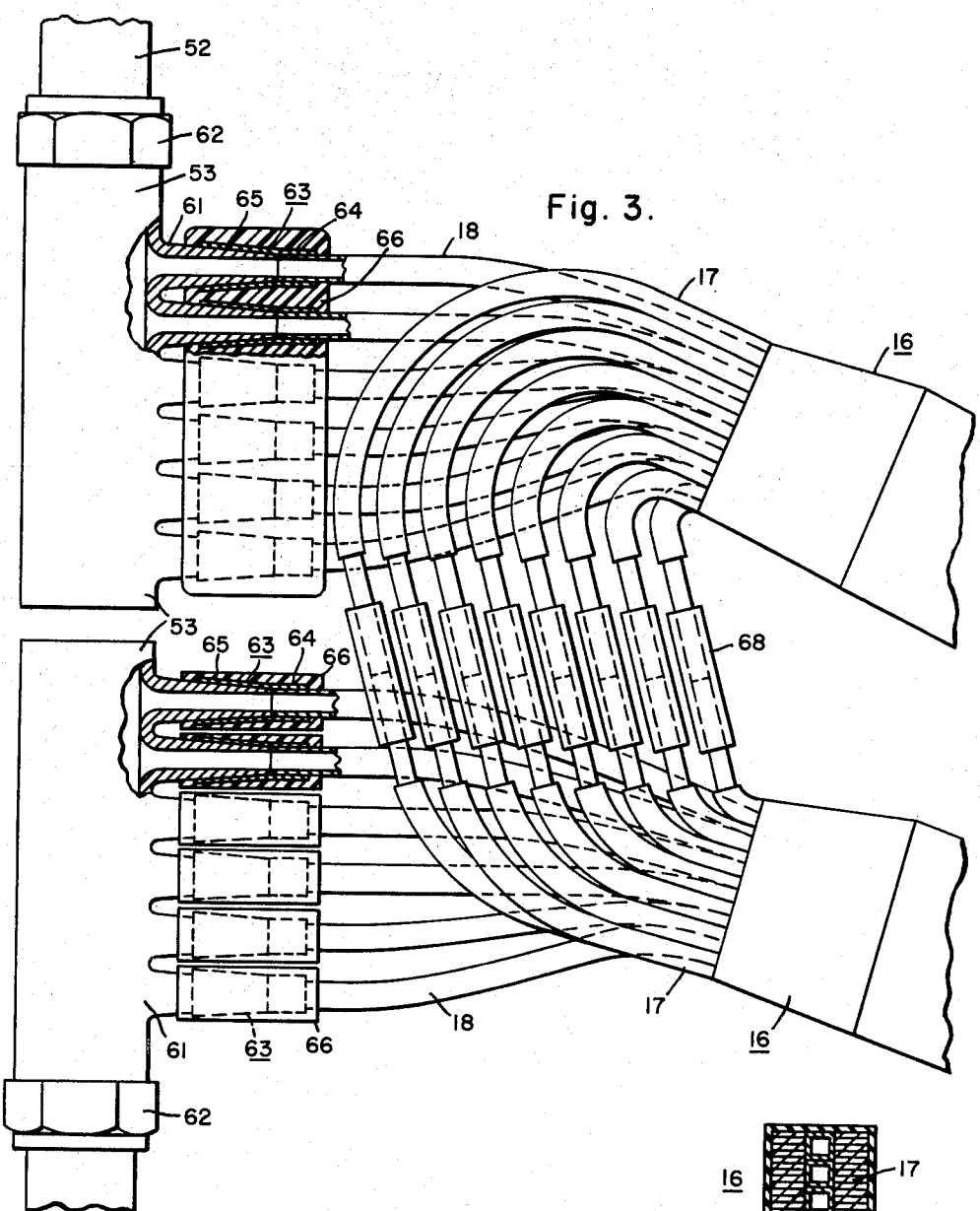

3,254,246
DYNAMOELECTRIC MACHINES
Harold M. Philofsky, Pittsburgh, and Charles R. Ruffing, Churchill Borough, Pa., assignors to Westinghouse Electric Corporation, Pittsburgh, Pa., a corporation of Pennsylvania
Filed June 22, 1964, Ser. No. 376,912
6 Claims. (Cl. 310—55)

This invention relates, generally, to dynamoelectric machines and, more particularly, to ventilation systems for turbine generators of relatively large size.

Large turbine generators are usually of the inner cooled, or direct cooled, construction in which a coolant fluid is circulated through duct means in the stator and rotor slots in direct thermal relation with the current carrying conductors inside the ground insulation. This type of construction provides a very effective cooling system and has made it possible to greatly increase the maximum ratings obtainable in large generators without exceeding the permissible limits of physical size.

These machines have usually been cooled by a coolant gas, hydrogen being commonly used, which fills the gas-tight housing and is circulated by a blower on the rotor shaft through the ducts of the stator and rotor windings and through radial ducts in the stator core. As the ratings of these large generators have increased, however, it has become desirable to further improve the cooling of the stator windings, and for this purpose it has been proposed to use more effective coolant fluids in the ducts of the stator winding. Such coolants may for example be a liquid such as water, or a gas at high pressure such as hydrogen at a pressure of several hundred pounds per square inch. The use of such coolant fluids requires that the coolant be circulated through the stator coils in a closed recirculating system separate and sealed from the coolant gas in the housing which cools the stator core and rotor winding.

One of the problems involved in providing a closed cooling system for the stator coils of a generator is the provision of a satisfactory connection from the external part of the cooling system to the cooling tubes or vent ducts located within the stator coils. One possible method of making these connections would be to solder or braze a connnection to each individual vent tube in each coil. Brazing an individual connection to each vent tube is prohibitively expensive, however, because of the large number of tubes in each machine. The tubes of each coil might also be brazed to a common metal fitting or connector but this would result in shorting the tubes together causing circulating currents and high eddy current losses, as well as interfering with making group transpositions. The heat required for a soldering or brazing operation is also undesirable because of the great care needed to prevent damage to adjacent insulation.

Another proposed method, which avoids these difficulties, is disclosed in a copending application, Serial No. 376,914, filed June 22, 1964, of H. M. Philofsky, and involves the use of an insulating connector for the tubes of each coil. In accordance with the present invention, a metal header is provided for connecting the tubes of each coil to the coolant system, and is arranged to effectively insulate the tubes and to be easily produced and applied.

It is, therefore, the principal object of the present invention to provide a dynamoelectric machine of the inner cooled type having a closed system for circulating coolant fluid through cooling ducts in the stator coils and having headers for connecting all the ducts of each coil to the coolant system while insulating the ducts from each other.

Another object of this invention is to connect the metal cooling ducts in a stator coil of a dynamoelectric machine to a metal header in a manner which insulates the ducts from each other.

A further object of the invention is to provide a header for connecting the stator coil cooling ducts into the cooling system for the machine which does not require any brazed or soldered connections to the header.

Other objects of the invention will be explained fully hereinafter or will be apparent to those skilled in the art.

In accordance with one embodiment of the invention, stator coil vent ducts or tubes are connected to a non-magnetic metal header having a plurality of hollow tapered fingers or projections on one side positioned to correspond to the positions of the ends of the vent tubes in the stator coil. Tapered fitttings are provided on the ends of the tubes for installing over the tapered projections on the header, and a strong adhesive is used to make a strong sealed joint between each tube and the header. The vent tubes are isolated electrically from the header by means of the adhesive and by insulation on the projections. After the vent tubes are connected to the header, the assembly may be encapsulated with a filled resin to increase the mechanical strength of the connection.

For a better understanding of the invention, reference may be had to the following detailed description taken in conjunction with the accompanying drawing, in which:

FIG. 2 is an enlarged cross-sectional view of one of the stator winding coils of the generator;

FIG. 3 is a view, partly in section and partly in elevation, of a connector constructed in accordance with the invention; and FIGS. 4, 5 and 6 are views, in side elevation, left end and right end, respectively, of a tapered fitting utilized with the connector.

Figure 1:
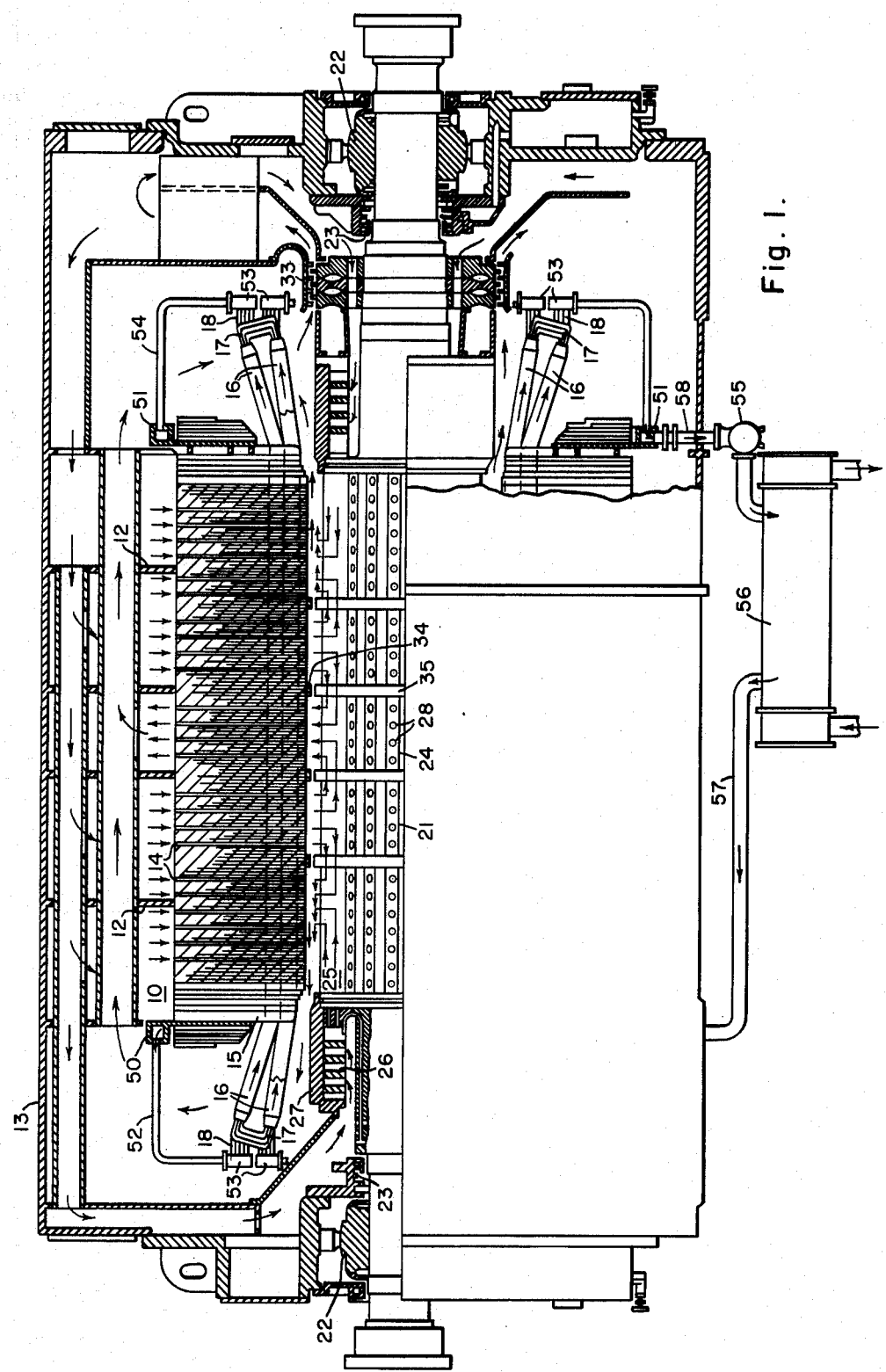
FIGURE 1 is a view, partly in longitudinal section and partly in elevation, of a generator embodying principal features of the invention.

Referring to the drawings, and particularly to FIG. 1, the generator construction shown for the purpose of illustration is generally similar to that shown in a patent to R. A. Baudry, No. 3,110,827, issued November 12, 1963. However, it will be understood that the present invention may be utilized with any dynamoelectric machine having a closed cooling system for the stator coils of the machine.

As shown, the generator has a stator core 10 supported by frame rings 12 in a substantially gas-tight outer housing 13. The stator core 10 is of the usual laminated type having a generally cylindrical bore therethrough.

The core 10 is built up of laminations arranged in spaced stacks to provide radial vent ducts 14 between them, and the laminations of the core are clamped between suitable end plates in the usual manner. The stator core 10 is provided with longitudinal slots 15 in its inner periphery for the reception of a stator winding which may be of any suitable type and which may consist of a plurality of half-coils 16 connected at their ends to form the winding. The stator winding is of the inner-cooled construction and, as shown in FIG. 2, each half-coil 16 comprises two stacks of conductor strands 17 which are lightly insulated and transposed in the usual manner, and which are separated by a stack of tubes or ducts 18 of high resistance metal which are lightly insulated from each other and from the conductor strands 17. The ducts 18 extend longitudinally from one end to the other of the half-coil 16 for circulation of a coolant fluid in close thermal relation to the conductor strands 17. The half-coil is enclosed in a heavy sheath of insulation 19 to provide the necessary high voltage insulation to ground. Two half-coils are placed in each slot 15 of the stator core and the slots are closed by suitable wedges in the usual manner.

A rotor 21 is disposed in the bore of the stator core 10 and separated from the stator by an annular air gap. The rotor 21 is supported in bearings 22 of any suitable type mounted in the ends of the housing 13 and gland seals 23 are provided to prevent leakage of gas from the housing along the rotor shaft. The rotor 21 is provided with longitudinal slots 24 in its periphery for the reception of a field winding 25. The conductors of the winding 25 extend longitudinally of the rotor and have circumferentially extending end turn portions 26 which are supported against centrifugal forces by retaining rings 27 of the usual construction. The rotor winding 25 may be of the type described in the above-mentioned patent, comprising a plurality of insulated turns each of which consists of two generally channel-shaped conductors placed in face-to-face relation to form a longitudinal duct extending from end to end of the rotor through the center of each turn of the winding. Radial passages 28 are provided in the rotor conductors to connect the longitudinal ducts to the air gap to permit the coolant gas in the housing to flow through the ducts.

The housing 13 of the machine is made as nearly gas-tight as possible, and is sealed at the points where the rotor shaft passes through it by the gland seals 23. The housing is filled with a suitable coolant gas, preferably hydrogen, which is used in the illustrated embodiment for cooling the rotor and the stator core. A blower 33 is mounted on the rotor shaft adjacent one end of the machine for circulating the gas therethrough. Any suitable type of blower may be utilized and a multi-stage blower of the axial flow type is shown in the drawing for the purpose of illustration. The gas in the machine is maintained at a suitable static pressure which, for example, may be from 30 to 75 pounds per square inch above atmospheric pressure, although lower or higher gas pressures may be utilized, depending on the desired rating of the machine. The blower 33 develops a sufficient differential pressure to maintain the desired circulation of gas within the housing and through the ducts in the rotor and the stator core.

The gas in the housing may be circulated in any desired manner by the blower 33 to flow through the radial ducts 14 of the stator core and through the ducts of the rotor winding to cool the stator core and the rotor. In the particular machine shown in the drawing, the air gap is divided transversely into a plurality of annular zones by means of baffles 34 on the stator core and baffles 35 on the rotor, and adjacent zones are maintained at different gas pressures to cause the gas to flow from high pressure zones to adjacent low pressure zones through the ducts of the rotor winding. Suitable baffles and ducts are provided in the housing to cause the gas to flow in the desired manner, indicated by arrows in FIG. 1. This method of cooling the rotor and the means by which the desired gas flow is obtained are fully described in the above-mentioned Baudry Patent No. 3,110,827 to which reference is made for a more complete description. The means for cooling the rotor and the stator core will not be further described herein, since they are not a part of the present invention, and the stator winding cooling system may be used in any machine having any desired cooling system for the rotor.

In accordance with the present invention, the stator winding is cooled by a closed recirculating system for circulating coolant fluid through the tubes 18 of the stator coils. Such a stator cooling system may include an intake manifold 50 at one end of the stator core 10 and a discharge manifold 51 at the opposite end. These manifolds may be annular passages extending circumferentially around the core and mounted at the ends of the stator core in any suitable manner. The intake manifold 50 is connected by a plurality of insulating pipes or tubes 52 to the end of each half-coil 16 of the winding, the tubes 52 being connected by suitable connectors or headers 53 to the ends of the vent tubes 18. At the opposite end, similar connectors or headers 53 connect the vent tubes 18 to insulating pipes or tubes 54 which are connected to the discharge manifold 51.

The coolant for the stator winding is circulated by means of an external pump or compressor 55, depending upon whether liquid or gas is utilized, which circulates the coolant discharged from the machine through a cooler 56, of any suitable type, and through an entrance pipe 57 which passes through the housing 13 and is connected to the intake manifold 50. The coolant discharged at the opposite end of the machine flows from the manifold 51 to a discharge pipe 58 which passes through the housing 13 to the pump or compressor 55.

In this way a closed recirculating system is provided which is entirely separate from the cooling system for the rotor and the stator core, so that more effective cooling of the stator winding can be obtained. The coolant fluid for the stator winding may be a suitable liquid, such as water, or hydrogen at a relatively high pressure such as 300 pounds per square inch, for example.

As explained hereinbefore, each half-coil 16 of the stator winding comprises a plurality of hollow tubes or ducts 18 which are arranged in a single stack between two stacks of conductor strands 17. Thus, it is necessary to provide for connecting each duct 18 to the external cooling system. Also, it is necessary to provide for joining the ends of the conductor strands 17 in different half-coils to electrically connect them. Furthermore, it is necessary to maintain group transposition of the stator coil to reduce losses.

In order to meet the foregoing requirements, the connector assembly disclosed herein is provided. As shown most clearly in FIG. 3, each connector assembly comprises two headers 53, each one of which has a plurality of hollow tapered fingers or projections 61 on one side which correspond in number and position to the ends of the vent tubes 18 of the stator coil. The ends of the vent tubes extend beyond the coil and are separated and disposed in spaced relation as shown. The header 53 is made of a non-magnetic metal, such as stainless steel or copper. The header is closed at one end and the other end has a fitting 62 thereon for connecting to the piping 52 or 54 of the stator cooling system.

Each projection 61 is tapered slightly, and tubular fittings 63 are attached to the end of each vent tube 18 to fit over the projections 61. As shown in FIGS. 4, 5 and 6, the fittings 63 are square or rectangular at one end 64, to receive the end of the vent tube 18, and round at the other end 65 to fit over the end of the finger or projection 61. The fittings 63 are preferably made of metal such as stainless steel and are preferably brazed or soldered onto the ends of the vent tubes 18. However, the fittings 63 may be attached to the ends of the vent tube by utilizing a suitable adhesive if desired.

FIG. 3 shows, somewhat diagrammatically, the ends of a half-coil 16 lying in the top position of one slot of the stator core and of another half-coil 16 lying in the bottom position of another slot. It will be seen that the vent tubes of each half-coil are all connected to one header 53. The same arrangement is preferably used at both ends of the coils. If desired, the header 53 could be made of sufficient length to attach the vent tubes from both of the half-coils in each slot, since their tubes lie in the same radial plane. However, the connection between half-coils are made more easily by providing a separate header for the vent tubes of each half-coil.

Before attaching the vent tubes to the header, the fingers or projections 61 are cleaned by well known methods, for example, by sand blasting or the use of a proper solvent or cleaning agent. The portions of the fittings 63 which fit over the projections 61 are also properly cleaned. Suitable insulation, such as glass tape, is applied to the the outside periphery of each projection 61 and a suitable adhesive is then applied to the surface of the insulation and the projection 61. Any suitable adhesive may be used which is capable of forming a strong, tight joint able to withstand the pressure of the coolant fluid. Such adhesives are commercially available. The vent tubes 18 may be held in position corresponding to the spacing of the projections 61 by means of a jig. The header 53 may then be tapped into place with the fittings 63 being pressed over the fingers or projections 61. Excess adhesive which is squeezed out is removed.

After the header has been positioned in the foregoing manner, portions of the projections 61 and the ends of the vent tubes 18 which are attached to the projections are encased in a suitable mold, and a filled, preferably thixotropic, potting resin 66 is poured into the mold, thereby strengthening the connection of the vent tubes with the header 53. A silica-filled epoxy resin is suitable for this purpose. All of the vent tubes connected to each header are preferably potted together as shown on the upper header in FIG. 3. If desired, however, on some or all of the headers, the tubes and projections might be individually encapsulated in the resin 66 as shown on the lower header in FIG. 3. Although room temperature curing adhesives and resins may be used, it is preferable to utilize adhesives and resins which are cured at an elevated temperature in order to develop maximum strength. Various adhesives and resins suitable for this purpose are readily available.

The ends of the conductor strands 17 of each half-coil 16 are electrically connected to the strands of another half-coil by the usual connectors 68, the usual group transposition being made as shown in FIG. 3. It will be seen that the arrangement and disposition of the headers is such that they do not interfere with the transposition.

From the foregoing description, it is apparent that the invention provides for connecting stator coil cooling tubes to an external cooling system by utilizing metal headers. The tubes are insulated from the headers by the glass insulation and the adhesive, so that the tubes are not shorted together and losses are minimized. The usual group transpositions of the conductor strands are easily made without interference with the cooling system. The headers are relatively simple in structure, and the tubes are attached to the headers in a relatively simple manner with joints which are strong and gas or liquid tight.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In a dynamoelectric machine having an annular stator core with a plurality of longitudinal slots therein, a plurality of stator winding members disposed in said slots, each of said winding members including winding conductors and a plurality of duct members disposed in good thermal relation with the winding conductors and insulated from the winding conductors and each other within the slot, coolant supply means for circulating a coolant fluid through said duct members, a metal header member at each end of each winding number, each of said header members being connected to the coolant supply means, the duct members at each end of each winding member being spaced apart and individually joined to the header member with electrically insulating, fluid-tight joints, and independent means for effecting electrical connection between the winding conductors of different winding members.

2. In a dynamoelectric machine having an annular stator core with a plurality of longitudinal slots therein, a plurality of stator winding members disposed in said slots, each of said winding members including winding conductors and a plurality of duct members disposed in good thermal relation with the winding conductors and insulated from the winding conductors and each other within the slot, coolant supply means for circulating a coolant fluid through said duct members, a metal header member at each end of each winding member, each of said header members being connected to the coolant supply means, each header member having a plurality of tubular projections, the duct members at each end of each winding member being spaced apart and each duct member being joined to one of said tubular projections with an electrically insulating, fluid-tight joint, and independent means for effecting electrical connection between the winding conductors of different winding members.

3. In a dynamoelectric machine having an annular stator core with a plurality of longitudinal slots therein, a plurality of stator winding members disposed in said slots, each of said winding members including winding conductors and a plurality of duct members disposed in good thermal relation with the winding conductors and insulated from the winding conductors and each other within the slot, coolant supply means for circulating a coolant fluid through said duct members, a metal header member at each end of each winding member, each of said header members being connected to the coolant supply means, each header member having a plurality of tubular projections, the duct members at each end of each winding member being spaced apart and each duct member being joined to one of said tubular projections with an electrically insulating, fluid-tight joint, a rigid mass of insulating material surrounding and enclosing said joints, and independent means for effecting electrical connection between the winding conductors of different winding members.

4. In a dynamoelectric machine having an annular stator core with a plurality of longitudinal slots therein, a plurality of stator winding members disposed in said slots, each of said winding members including winding conductors and a plurality of duct members disposed in good thermal relation with the winding conductors and insulated from the winding conductors and each other within the slot, a coolant system for circulating coolant fluid through said duct members, the coolant system including pipe means for connection to the duct members of each winding member, a metal header member at each end of each winding member, each of said header members being connected to a corresponding pipe means, the duct members at each end of each winding member being spaced apart and individually joined to the header member with electrically insulating, fluid-tight joints, and independent means for effecting electrical connection between the winding conductors of different winding members.

5. In a dynamoelectric machine having an annular stator core with a plurality of longitudinal slots therein, a plurality of stator winding members disposed in said slots, each of said winding members including winding conductors and a plurality of duct members disposed in good thermal relation with he winding conductors and insulated from the winding conductors and each other within the slot, a coolant system for circulating coolant fluid through said duct members, the coolant system including pipe means for connection to the duct members of each winding member, a metal header member at each end of each winding member, each of said header members being connected to a corresponding pipe means, each header member having a plurality of tubular projections, the duct members at each end of each winding member being spaced apart and each duct member being joined to one of said tubular projections with an electrically insulating, fluid-tight joint, and independent means for effecting electrical connection between the winding conductors of different winding members.

6. In a dynamoelectric machine having an annular stator core with a plurality of longitudinal slots therein, a plurality of stator winding members disposed in said slots, each of said winding members including winding conductors and a plurality of duct members disposed in good thermal relation with the winding conductors and insulated from the winding conductors and each other within the slot, a coolant system for circulating coolant fluid through said duct members, the coolant system including pipe means for connection to the duct members of each winding member, a metal header member at each end of each winding member, each of said header members being connected to a corresponding pipe means, each header member having a plurality of tubular projections, the duct members at each end of each winding member being spaced apart and each duct member being joined to one of said tubular projections with an electrically insulating, fluid-tight joint, a rigid mass of insulating material surrounding and enclosing said joints, and independent means for effecting electrical connection between the winding conductors of different winding members.

References Cited by the Applicant

UNITED STATES PATENTS 2,695,368 11/1954 Kilbourne.
2,873,393 2/1959 Baudry.
3,110,827 11/1963 Baudry.

ORIS L. RADER, *Primary Examiner.*

L. L. SMITH, *Assistant Examiner.*